United States Patent [19]
Schmucker

[11] Patent Number: 5,508,111
[45] Date of Patent: Apr. 16, 1996

[54] ADHESIVE COMPOSITION

[75] Inventor: Arden E. Schmucker, Alliance, Ohio

[73] Assignee: GenCorp, Fairlawn, Ohio

[21] Appl. No.: 27,542

[22] Filed: Mar. 5, 1993

Related U.S. Application Data

[63] Continuation of Ser. No. 669,147, Mar. 13, 1991, abandoned.

[51] Int. Cl.$^6$ .......................... B32B 27/00; C08G 18/10; C08G 18/30; C08L 75/00
[52] U.S. Cl. ................. 428/423.1; 524/196; 524/198; 524/590; 524/871; 528/60; 528/61; 528/64
[58] Field of Search .................. 524/196, 198, 524/590, 871; 528/60, 61, 64; 428/423.1

[56] References Cited

U.S. PATENT DOCUMENTS

| | | |
|---|---|---|
| 3,442,827 | 5/1969 | Friedman . |
| 3,501,329 | 3/1970 | Kent . |
| 3,786,030 | 1/1974 | Rice ........................................ 260/77.5 |
| 3,980,594 | 9/1976 | Fabris ........................................ 428/423 |
| 4,011,180 | 3/1977 | Lockwood .............................. 428/314 |
| 4,267,299 | 5/1981 | Oechsle, III ............................... 528/48 |
| 4,346,144 | 8/1982 | Craven ..................................... 428/335 |
| 4,452,944 | 6/1984 | Dawdy ..................................... 525/126 |
| 4,515,933 | 5/1985 | Chang . |
| 4,552,934 | 11/1985 | Rabito et al. ........................... 525/458 |
| 4,636,425 | 1/1987 | Johnson et al. ......................... 428/198 |
| 4,663,377 | 5/1987 | Hombach et al. ...................... 524/196 |
| 4,778,844 | 10/1988 | Blount ..................................... 524/706 |
| 4,876,308 | 10/1989 | Melby et al. ............................ 524/780 |
| 4,954,199 | 9/1990 | Rains et al. ........................... 156/331.7 |
| 4,994,540 | 2/1991 | Boerner et al. . |
| 5,002,806 | 3/1991 | Chung ...................................... 528/60 |
| 5,128,433 | 6/1992 | LeCompte ................................ 528/60 |
| 5,162,162 | 11/1992 | Yasuda et al. . |
| 5,164,473 | 11/1992 | Dormisch et al. ........................ 528/44 |
| 5,175,228 | 12/1992 | Wang et al. .............................. 528/48 |

FOREIGN PATENT DOCUMENTS

| | | |
|---|---|---|
| 743156 | 9/1966 | Canada . |
| 772670 | 11/1967 | Canada . |
| 0010411 | 4/1980 | European Pat. Off. . |
| 0063534 | 10/1982 | European Pat. Off. . |
| 0248254 | 9/1987 | European Pat. Off. . |
| 87107157 | 12/1987 | European Pat. Off. . |
| 0328808 | 8/1989 | European Pat. Off. . |
| 0349838 | 1/1990 | European Pat. Off. . |
| 1803748 | 7/1969 | Germany . |
| 57-182374 | 11/1982 | Japan . |
| 62-290782 | 12/1987 | Japan . |
| 1-210482 | of 1989 | Japan . |
| 837120 | 6/1960 | United Kingdom . |
| 2077741 | 12/1981 | United Kingdom . |

OTHER PUBLICATIONS

PTO Translation of JP 62–290782 (Supplied by Applicant) to Raines et al.
An article entitled "Polyurethane Elastomers with Hydrolyic and Thermooxidative Stability I. Polyurethanes with N–Alkylated Polyamide Soft Blocks," Journal of Polymer Science, Part A: Polymer Chemistry, vol. 28, 1473–1482 (1990).
An article entitled "Polyurethane Elastomers with Hydrolytic and Thermooxidative Stability. II. Polyurethanes with N–Alkylated Polyurethane Soft Blocks," Journal of Polymer Science: Part A: Polymer Chemistry, vol. 28, 3685–3699 (1990).
An article entitled "Chemical Degradation of Polyurethane," V. Gajewski, 33rd Annual Polyurethane Technical Marketing Conference, Sep. 30–Oct. 3, 1990.
An article entitled "Mechanisms of Thermal Decomposition in Totally Aromatic Polyurethanes," S. Foti, P. Maravigna, and G. Montaudo, Journal of Polymer Science: Polymer Chemistry Edition, vol. 19, 1679–1687 (1981).
An article entitled "An Investigation of the Thermolysis Mechanism of Model Urethanes," K. J. Voorhees, F. D. Hileman, I. N. Einhorn and J. H. Futrell, Journal of Polymer Science: Polymer Chemistry Edition, vol. 16, 213–228 (1978).
An article entitled "Thermal Stability of Isocyanate–Based Polymers. 2. Kinetics of the Thermal Dissociation of Model Urethane, Oxazolidone, and Isocyanurate Block Copolymer," P. I. Kordomenos, J. E. Kresta, and K. C. Frisch, Macromolecules, 1987, 20, 2077–2083.
An article entitled "Thermal Stability of Isocyanate–Based Polymers. 1. Kinetics of the Thermal Dissociation of Urethane, Oxazolidone, and Isocyanurate Groups," P. I. Kordomenos and J. E. Kresta, Macromolecules, 1981, 14, 1434–1437.
An article entitled "Side Reactions in the Formation of Polyurethanes: Stability of Reaction Products of Phenyl Isocyanate," M. Spirkova, M. Kubin, and K. Dusek, J. Macromol Sci.–Chem., A27(4), pp. 509–522 (1990).
An article entitled "Mechanism of Thermal Degradation of Polyurethanes Investigated by Direct Pyrolysis in the Mass Spectrometer," A. Ballistreri, S. Foti, P. Maravigna, G. Montaudo, and E. Scamporino, Journal of Polymer Science: Polymer Chemistry Edition, vol. 18, 1923–1931 (1980).
An article entitled "Thermal Degradation of N–Substituted Polycarbamates," Elizabeth Dyer and Richard J. Hammond, Journal of Polymer Science: Part A, vol. 2, pp. 1–14 (1964).
An article entitled "Thermal Degradation of the Polyurethane from 1,4–Butanediol and Methylene Bis (4–Phenyl Isocyanate)," N. Grassie and M. Zulfigar, Journal of Polymer Science: Polymer Chemistry Edition, vol. 16, 1563–1574 (1978).
*Encyclopedia of Polylmer Science and Engineering*, vol. 1, p. 565, 1985, Wiley—Interscience: NY.
*Advances in Urethane Science and Technology*, vol. 2, pp. 56–61, entitled "Adhesion of Urethanes from Oxyproplene Polyols", 1973, Technomic®Publishing Co.: Westport, CT.
U.S. Patent Application No. 06/868,866, filed May 30, 1986, Randall C. Rains et al.
U.S. Patent Application No. 06/925,002, filed Oct. 29, 1986, Randall C. Rains et al.

*Primary Examiner*—Paul R. Michl
*Assistant Examiner*—Patrick Niland
*Attorney, Agent, or Firm*—Robert F. Rywalski; Samuel B. Laferty

[57] ABSTRACT

A polyurethane adhesive formed from (I) an NCO terminated prepolymer with excess of NCO and talc, and (II) a polyol, a urethane catalyst, talc and a minor amount of certain aryl or aromatic polyamines exhibits good sag and thixotropic properties and, also, exhibits good lap shear strength when cured between treatment-free substrates.

35 Claims, No Drawings

ADHESIVE COMPOSITION

This is a continuation of application(s) Ser. No. 07/669,147, filed on Mar. 13, 1991, now abandoned.

This invention relates to an adhesive composition such as a polyurethane adhesive.

Polyurethane (PU) adhesive compositions are widely used for binding of FRP assemblies. Typically, an FRP assembly is fabricated by bonding an inner structural panel to a thin outer appearance panel. An example of PU adhesives used for this application are two component systems in which a mixture of a polyurethane prepolymer and inert fillers are mixed with a curative consisting of multifunctional polyol(s), catalyst, and thickening and/or thixotropic agents to form the final adhesive. The two components are usually homogeneously combined via meter-mixing equipment using static mixers. A bead (¼–½" diam.) of the mixed adhesive is applied to one of the bonding surfaces. The inner and outer panels are then mated and the adhesive allowed to cure. Cure is enhanced by putting the assembly in a fixture equipped with heated clamps.

In order to prevent bead sag, a number of agents have been cited in the literature. Diamines are commonly used to react with some of the isocyanate to form polyureas with good hydrogen bond thickening. However, there are drawbacks and limitations in their use: (1) often a sizeable amount is needed, (2) the larger amounts needed and the rapid reaction of the aliphatic amines with isocyanate cause large occlusions of the curative to be encapsulated in the prepolymer which requires high shear mixing to get proper cure, (3) all secondary amines react with isocyanate(s) too slowly, (4) the aromatic primary amines which have basicity reducing substituents; such as ester-, keto-, halo-, and/or sulfonyl-groups attached to the ring carbon(s) also react too slowly with isocyanate(s). An example is Polacure 740M from Polaroid Corp., (5) some agents develop and depend on mainly a high viscosity with little thixotropicity to prevent sag and thus the wetting of the substrate surface needed for adhesion is impaired, (6) many agents need to be prereacted with isocyanate before adding to the curative, (7) some agents are not soluble in the curative, and (8) mineral based thixatropic fillers like silicas are difficult to process.

An object of this invention is to avoid the difficulties alluded to before cure to provide a new adhesive useful for among other things joining together FRP panels or parts.

According to the present invention, an adhesive composition such as a polyurethane adhesive composition is provided which provides for (1) specific aromatic polyamines that have the right balance of reactivity with aromatic diisocyanates to rapidly form polyureas giving a hydrogen bonded network that gives good thixotropic properties and sag resistance in the adhesive mix without the difficulties alluded to above where occlusions occur, and (2) good lap shear properties when cured between panels such as FRP panels.

The two component polyurethane adhesive composition of the present invention contains a urethane prepolymer component and a curative component. The urethane prepolymer component is made from a polyol intermediate and an excess equivalent amount of a polyisocyanate so that free NCO groups exist. Such free NCO groups are located on the ends of the prepolymer and on the unreacted polyisocyanate. Typically, the prepolymer reaction takes place in the presence of a moisture free powdery mineral filler.

The polyol intermediate is generally a liquid polyether polyol or a polyester polyol, or combinations thereof having a number average molecular weight of from about 400 to about 9,000 with from about 3,000 to about 7,000 being preferred. A wide range of polyether or polyester polyols can be used in making the adhesives of the present invention such as diols, triols, tetrols, and the like. Polyether polyols are generally made by reacting an alkylene oxide having from 2 to 10 carbon atoms such as propylene oxide with a strong base such as potassium hydroxide, preferably in the presence of water, glycols and so forth. Polyethers having a highly branched chain are readily prepared from alkylene oxides and initiators having an active hydrogen functionality greater than 2. The higher functional initiators that are useful with the alkylene oxides described above include polyols, polyamines and amino alcohols having a total of three or more reactive hydrogen atoms or hydroxyl and primary or secondary amino groups and generally having up to 12 carbon atoms.

Suitable polyols include triols, such as glycerol, trimethylolpropane, butanetriols, hexanetriols, trialkanolamines, various diethylenetriamines, such as erythritol and pentaerythritol; pentols, hexols, such as dipentaerythritol and sorbitol; as well as alkyl glucosides, carbohydrates, polyhydroxy fatty acid esters such as castor oil; and polyoxy alkylated derivatives or polyfunctional compounds having three or more reactive hydrogen atoms, such as, the reaction product of trimethylolpropane, glycerol and other polyols with ethylene oxide, propylene oxide or other epoxides or copolymers thereof, e.g., copolymers of ethylene and propylene oxides with ethylene oxide being used in a molar amount of not over 20 mol percent as compared to other alkylene oxides like propylene oxide. Examples of higher functional amino alcohols and polyamines include ethanolamine; diethanolamine; triethanolamine; isopropanolamine; diisopropanolamine; triisopropanolamine; 2-(2-aminoethylamino)ethanol; 2-amino-2(hydroxymethyl)-1,3-propanediol; ethylenediamine; diethylenetriamine; triethylenetetramine; and urea as well as various aryl polyamines such as 4,4',4"-methylidynetrianiline.

Other polyethers which can be utilized are those which are produced as by polymerization of tetrahydrofuran or epoxides (such as ethylene oxide, propylene oxide, butylene oxide, styrene oxide, or epichlorohydrin), or by addition of epoxide compounds (preferably ethylene oxide or propylene oxide), alone, in a mixture, or in succession, to starting components with reactive hydrogen atoms such as water, polyhydric alcohols, ammonia or polyfunctional amines.

Polyester polyols are formed from the condensation of one or more polyhydric alcohols having from 2 to 15 carbon atoms with one or more polycarboxylic acids having from 2 to 14 carbon atoms. Examples of suitable polyhydric alcohols include the following: ethylene glycol, propylene glycol such as 1,2-propylene glycol and 1,3-propylene glycol; glycerol; pentaerythritol; trimethylolpropane; 1,4,6-octanetriol; butanediol; pentanediol; hexanediol; dodecanediol; octanediol; chloropentanediol; glycerol monoallyl ether; glycerol monoethyl ether; diethylene glycol; 2-ethylhexanediol-1,4; cyclohexanediol-1,4; 1,2,6-hexanetriol; 1,3,5-hexanetriol; 1,3-bis-(2-hydroxyethoxy)propane and the like. Examples of polycarboxylic acids include the following: phthalic acid; isophthalic acid; terephthalic acid; tetrachlorophthalic acid; maleic acid; dodecylmaleic acid; octadecenylmaleic acid; fumaric acid; aconitic acid; trimellitic acid; tricarballylic acid; 3,3'-thiodipropionic acid; succinic acid; adipic acid; malonic acid, glutaric acid, pimelic acid, sebacic acid, cyclohexane-1,2-dicarboxylic acid; 1,4-cyclohexadiene-1,2-dicarboxylic acid; 3-methyl-3,5-cyclohexadiene-1,2-dicarboxylic acid and the corresponding acid anhydrides, acid chlorides and acid esters such as phthalic anhydride, phthaloyl chloride and the dimethyl ester of phthalic acid. Preferred polycarboxylic acids are the aliphatic and cycloaliphatic dicarboxylic acids containing no more than 14 carbon atoms and the aromatic dicarboxylic acids containing no more than 14 atoms. Any polyhydric alcohol having more than 2 hydroxyl groups or any polycarboxylic acid having more than 2 carboxylic groups used to make the polyesters should be used in only very minor amounts to prevent crosslinking and gelling.

Polyesters from lactones (for example ε-caprolactone) and polyacetals, polycarbonates or polybutadienes containing terminal hydroxyl groups are also suitable.

Highly preferred polyol intermediates include polypropylene ether diol; poly-1,2-butylene ether diol; poly-1,4-tetramethylene ether; and ε-polycaprolactone diols.

In order to achieve specific properties which are influenced by the composition and content of polyurethane hard blocks, small amounts of polyhydric alcohols are optionally utilized in combination with the above-noted liquid polyether or polyester glycol intermediates. The polyhydric alcohols generally have from 2 to 15 carbon atoms with specific examples including ethylene glycol; 1,2-propylene glycol; 1,3-propylene glycol; 1,4-butane diol; 2,3-butane diol; 1,5-pentanediol; glycerol; sorbitol; pentaerythritol; dipropylene glycol; diethylene glycol; and the like. The amount of such polyhydric alcohols is generally from about 0 or 1 to about 40 parts by weight and preferably from about 0 or 1 to about 10 parts by weight based upon 100 parts by weight of the polyether polyol intermediate, the polyester polyol intermediate, or combinations thereof.

The equivalent ratio of the polyisocyanate utilized to make the prepolymer to the hydroxyl containing polyol intermediate (NCO/OH) is generally from about 2 to about 20 and preferably from about 5 to about 10. Such large excesses are necessary to achieve relatively low molecular weight polyurethane prepolymers, since the hydroxyl groups of the intermediate are capped without significant chain extension. The polyisocyanates generally have the formula $R(NCO)_n$ where n is an integer of 2, 3 or 4 with approximately 2 being preferred. However, it is to be understood that since combinations of various polyisocyanates can be utilized, the equivalent amount of isocyanate can vary and often is not an integer. R is an aliphatic having from about 2 to about 20 carbon atoms with from about 6 to about 15 carbon atoms being preferred, an aromatic including an alkyl substituted aromatic having from about 6 to about 20 carbon atoms with from about 6 to about 15 carbon atoms being preferred, or combinations thereof. Aromatic diisocyanates are desired since the aliphatic diisocyanates generally react too slow. Examples of suitable polyisocyanates include 1,6-diisocyanato hexane; 2,2,4- and/or 2,4,4-trimethyl hexamethylene diisocyanate; p- and m-tetramethyl xylene diisocyanate; dicyclohexylmethane-4,4'-diisocyanate (hydrogenated MDI); 4,4-methylene diphenyl isocyanate (MDI); p- and m-phenylene diisocyanate; 2,4- and/or 2,6-toluene diisocyanate (TDI); durene-1,4-diisocyanate; isophorone diisocyanate; isopropylene-bis-(p-phenyl isocyanate) and sulfone-bis-(p-phenylisocyanate). Also useful are diisocyanates prepared by capping low molecular weight, that is less than 300, diols, ester diols or diamines with diisocyanates, such as the reaction products of one mole of 1,4-butanediol or bis-(4-hydroxybutyl)-succinate (molecular weight=262) with two moles of hexamethylene diisocyanate. Any combination of diisocyanates can also be employed. Combinations of slower reacting aliphatic with faster reacting aromatic diisocyanates can be advantageously used. Examples of still other isocyanates include 1,5-naphthalenediisocyanate; cumene-2,4-diisocyanate; 4-methoxy-1,3-phenylenediisocyanate; 4-chloro-1,3-phenylenediisocyanate; 4-bromo-1,3-phenylenediisocyanate; 4-ethoxy-1,3phenylenediisocyanate; 2,4'-diisocyanatodiphenylether; 4,4'-diphenyldiisocyanate; 4,6-dimethyl-1,3-phenylenediisocyanate; 1,10-anthracenediisocyanate; 4,4'-diisocyanatodibenzyl; 3,3-dimethyl-4,4'-diisocyanatodiphenylmethane; 2,6-dimethyl-4-4'-diisocyanatodiphenyl and others and mixtures of the same. The various diphenylmethane diisocyanates (MDI) and mixtures of MDI with polymeric MDI having an average isocyanate functionality of from about 2 to about 3.2 are preferred.

Numerous fillers can be utilized in the prepolymer component. The fillers are generally mineral (inorganic) and in a powdery form and serve to adjust the urethane prepolymer adhesive component viscosity as well as to lower the cost thereof. The fillers can at times impart improved adhesion. Examples of specific fillers include ground mica, talc, kaolin clay, calcium carbonate, calcium sulfite, colloidal silica, wollastonite, ballotini, hollow glass microspheres, glass carbon and graphite fibers, various metallic oxides such as zinc, titanium, zirconium, and the like, ground quartz, various metallic silicates, metallic powders such as lead, aluminum, bronze, and the like. A preferred filler is talc. The amount of filler is generally an effective amount to produce a viscosity so that the prepolymer component can be readily pumped through processing equipment such as adhesive meter-mixing machines. Such an effective amount is usually from about 5 to about 100 parts by weight and preferably from about 20 to about 50 parts by weight per 100 parts by weight of the prepolymer.

The curative component contains a polyol having two or more active hydroxyl groups. Desirably the curative also contains an inert mineral powdery filler, a primary aromatic amine, a polyurethane catalyst, and various pigments or dyes. It is an important aspect of the present invention that the amount of curative compound is such that the equivalent ratio or isocyanate index of isocyanate groups of the prepolymer to OH+NH$_2$ groups of the curative component is from about 1.2 to about 2.0, desirably 1.35 to about 1.6 and preferably 1.35 to about 1.45. Such equivalent ranges yield good adhesion to an FRP or to a metal substrate without the need of any surface pretreatment. That is, the surface is treatment-free. By the term "treatment-free" it is meant that the substrate such as the FRP or the metal need not be treated whatsoever (1) mechanically as by sanding, abrading, etc., (2) with a solvent such as methylene chloride, acetone, toluene, and the like, or (3) with a chemical treatment such as through the use of various primers, isocyanates, or amines. The formed adhesive is utilized to bond or adhere FRP to FRP, FRP to a metal, FRP to a painted metal, and FRP to various plastic substrates as for example polyurethane, polyurea, nylon, polydicyclopentadiene, molded epoxy, molded thermoplastic polyesters, and the like.

The curative polyol is a polyol which can be the same as the intermediate polyol utilized to form the prepolymer. Hence, the above description of the intermediate polyol is hereby fully incorporated by reference. An essential requirement of the polyol is that it be of a type such that a crosslinked polyurethane adhesive is formed upon cure of the adhesive composition. Thus, if the polyol intermediate and the polyisocyanate used to make the urethane prepolymer are essentially difunctional, the polyol curative should contain sufficient hydroxyls containing more than two OH groups per molecule so that a stable crosslinked network is formed when the curative is utilized. Alternatively, if either the intermediate polyol or the polyisocyanate used to make the prepolymer adhesive base has a functionality significantly greater than 2, the curative polyol may have a functionality of 2, or optionally greater than 2, to form the crosslinked network. Examples of curative polyols include a polyether or a polyester polyol having a molecular weight of from about 400 to about 10,000, such as the various above-noted polyol intermediates, or triols, tetrols, pentols, hexols, and the like as noted above.

However, various low molecular weight polyols are generally desired or preferred as the curative component. A class of such polyols include the alkyl, aromatic, or alkyl substituted aromatic diols having from 2 to about 12 carbon atoms with from about 2 to about 8 carbon atoms being preferred. Specific examples include ethylene glycol; propylene glycol; butane diol such as 1,4-butane diol; and the like. Another preferred class are the various polyhydric alcohols having from 3 to 15 carbon atoms and preferably from 3 to 10 carbon atoms and from 3 to 8 hydroxyl groups such as triols, tetrols, pentols, hexols, and the like with specific examples including glycerol, erythritol, pentaerythritol, arabitol, sorbitol, trimethylol propane, the various ethylene or propylene oxide adducts or trimethylol propane, glycerol, pentaerythritol, sorbitol, and the like. Included within the definition of low molecular weight polyols according to the concepts of the present invention are the various carbohydrates such as the various disaccharides and especially the monosaccharides, along with reaction products thereof with alcohols having from 1 to 5 carbon atoms such as for example alkyl glucoside, and the like. Examples of specific disaccharides include sucrose, lactose, and maltose. Examples of monosaccharides include the various pentoses such as arabinose, xylose, lyxose, ribose, as well as the various hexoses such as glucose, gulose, mannose, galactose, talose, allose, altrose, idose, fructose, sorbose, and the like can be utilized. Of the various carbohydrates, the various alkyl glucosides with the alkyl group having from 1 to 12 carbon atoms are preferred.

Examples of preferred polyols include ethylene or propylene oxide adducts of trimethylol propane, pentaerythritol, glycerol, alkyl glucosides, or carbohydrates, with the propylene oxide adduct of pentaerythritol being preferred.

The inert filler which is utilized in the curative component can be the same as set forth above. Hence, talc, kaolin clay, and colloidal silica are desired with talc being preferred. The amount of the inorganic inert material filler which is utilized in the curative component is an effective amount to produce a viscosity level which can be readily pumped through processing equipment such as adhesive meter mixing machines. Such a level is usually from about 5 parts to about 100 parts by weight and preferably from about 30 to about 60 parts by weight per 100 parts by weight of polyol curative.

Primary aromatic amines are utilized to provide sag resistance to the adhesive composition or system once the polyol curative component and the urethane prepolymer component are mixed.

A typical generic structure of the aromatic polyamines of the present invention is:

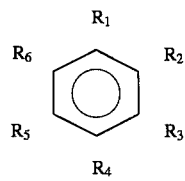

Formula (I)

where $R_1$ is

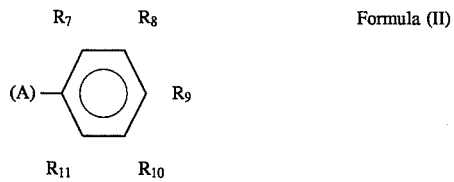

Formula (II)

or the same as any of $R_2$ through $R_6$ and wherein the $R_2$ through $R_6$ as well as the $R_7$ through $R_{11}$ groups are independently selected from the groups of: H; $NH_2$; $C_1$ to $C_5$ alkyl; or phenyl. A in Formula II is an alkylene hydrocarbon containing 0 to 12 carbons. There needs to be at least 2 $NH_2$ groups per molecule and where $R_1$ is not Formula II, at least 4 of the $R_1$ through $R_6$ groups are not H, and Formula I is not diethyl toluene diamine, and where A in Formula II is 1, at least 4 of the $R_2$ through $R_{11}$ groups are not H. Examples of the above are: 2,3,5,6-tetramethyl-1,4-phenylene diamine; 3,3'-dimethyl-4,4'-diaminobiphenyl (Dark Blue R Base from Kennedy & Klim); 3,3',4,4'-tetraaminobiphenyl (TAB from Kennedy & Klim); 4,4'-methylene bis(3-methylaniline) which is MBOT from Kennedy & Klim; and 4,4'-diamino-2,2'-dimethylbibenzyl.

Another typical generic structure of the aromatic polyamines of the present invention is the fused polycyclic aromatic rings which have groups of H, $NH_2$, $C_1$ to $C_5$ alkyl, or phenyl attached to the ring carbons which are not bridgehead carbons (carbons commonly shared by 2 or 3 rings) and provided that there are at least 2 $NH_2$ groups per molecule. Examples of this type are: 1,5-diamino naphthalene; 1,8-diamino naphthalene; 2,3-diamino naphthalene; 9,10-diamino phenanthrene; 2,7-diamino fluorene and 1,10-diamino pyrene. The aromatic polyamines of the two generic types cited above are effective anti-sag agents whether used individually or in combination with each other.

The primary aromatic amine generally reacts with an equivalent amount of a free isocyanate group (NCO) in the adhesive base to produce a polyurea. The reaction generally occurs within a few seconds and the polyurea produced forms a strong hydrogen bonded network and significantly increases the viscosity of the mixed adhesive before cure and thereby provides sag resistance. An effective amount of the polyurea is thus utilized to prevent sag in the end product before cure thereof. Such an effective amount is generally from about 0.5 to about 3 parts by weight and preferably about 1 part by weight per 100 parts by weight of said polyol curative.

The catalyst used to promote the urethane chain extension and crosslinking reaction is preferably a tin compound such as, for example, various stannous carboxylates like stannous acetate, stannous octoate, stannous laurate, stannous oleate and the like; or dialkyl tin salts of carboxylic acids such as dibutyltin diacetate, dibutyltin dilaurate, dibutyltin maleate, dibutyltin di-2-ethylhexoate, dilauryltin diacetate, dioctyltin diacetate and the like. Similarly, there can be used a trialkyltin hydroxide, dialkyltin oxide or dialkyltin chloride. As an alternative or in addition to the above tin compounds, various tertiary amines can be used such as triethylamine, benzyldimethylamine, triethylenediamine and tetramethylbutanediamine. The tin catalysts, when utilized, are generally used in amounts of 1.0 part or less, i.e., in the range of about 0.01 to 1.0 parts, by weight per 100 parts of prepolymer. The tertiary amine catalysts, when utilized, can be used in amounts of 0.01 to about 5 parts by weight per 100 parts of prepolymer. However, at least 0.01 part of at least one type of catalyst should be present. In addition to the above catalysts, organomercury or organic bismuth compounds can be utilized wherein the organic portion is an aliphatic and preferably an alkyl having from 2 to 20 carbon atoms. The amount is generally from about 0.01 to about 1.0 parts by weight per 100 parts by weight of the prepolymer.

If it is desired that the polyurethane adhesive composition of the present invention have a color or hue, any conventional pigment or dye can be utilized in conventional amounts. Hence, any pigment known to the art and to the literature can be utilized as for example titanium dioxide, iron oxide, carbon black, and the like, as well as various dyes provided that they do not interfere with the urethane reaction.

The curative component can generally be prepared in any conventional manner. For example, the filler can be added to the curative polyol and mixed therewith. Similarly, the primary amine, the various urethane catalysts, and the various pigments and dyes, if utilized, can also be added and mixed. Generally, any mixing order can be utilized. Similarly, the prepolymer component can be prepared in any conventional manner, for example, the filler can be added to the urethane prepolymer and mixed therewith. The two components can then be added to each other and mixed in a suitable manner as by using meter mixing equipment.

The primary aromatic amine(s) in the curative reacts within a few seconds with the isocyanate of the base to form polyureas which thicken the adhesive through hydrogen bonding. Preferably this reaction takes place in the static mixer or at least before the adhesive bead is applied to the substrate in order to prevent bead sag. The primary aromatic amine(s) of the present invention provides good thixotropic character to the newly mixed adhesive. The thixotropic index is the ratio of the Brookfield viscosity run at 1 rpm to that run at 10 rpm. This thixotropic index is generally more than 3 and preferably more than 5. This high index provides for low viscosity needed for (1) good static mixing, and (2) good surface wetting of the substrate. The high index also provides for the high viscosity needed to prevent bead sag (low shear conditions). In the newly mixed adhesive, a gel is generally formed in about 10 minutes and a cure is obtained in about 30 minutes at room temperatures.

Generally to ensure the formation of a suitable adhesive bond within a relatively short time, that is generally less than 5 minutes and preferably less than 1 minute, the mixed urethane prepolymer component and curative component are heated to a temperature of at least 50° C. and preferably from about 90° to about 125° C. Naturally, the reaction time to form a suitable bond will depend upon the particular type of polyisocyanate utilized, the particular type of polyol curative utilized, the particular type of urethane catalyst utilized, the curing temperature, and the like.

The urethane adhesive compositions of the present invention are suitable for application to non-treated or surface-treatment free substrates such as FRP substrates, metal substrates, plastic substrates, and the like. The adhesive of the present invention can thus be utilized to bond at least two such substrates together to form a urethane adhesive composite. An area of particular use is in the automotive industry wherein FRP structural components are bonded to automobile body panels such as hoods, doors, fenders, front ends, trunk lids, and the like.

The invention will be better understood by reference to the following examples.

EXAMPLE 1

A polyurethane prepolymer was prepared using the following procedure: polypropylene ether diol, 3000 molecular weight (39.5 parts by weight), and styrenated diphenyl amine (0.40 parts), were charged to a clean, dry reactor. The reactor and its contents were heated with stirring to 110° C. During the heating cycle, powdered talcum (23.2 parts), was added. The reactor was heated to 110° C. under vacuum (>28") for 2 hours. The contents of the reactor were sampled and analyzed by Karl Fischer titration for water ($\leq 0.09\%$ $H_2O$). The reactor was cooled to 80° C. and evacuated before adding 16.95 parts of methylene bis(4-phenyl) isocyanate (MDI) containing higher molecular weight oligomers of MDI. The contents of the reactor were mixed for 2 hours at 100° C. when an additional 16.95 parts of the above isocyanate mixture was added along with 3.0 parts of a powdered 4A molecular sieves. The contents of the reactor were mixed at 100° C. for 10 minutes under vacuum before cooling to 60° C. and discharging under nitrogen. The NCO content of the final product is 2.10 meg/gm and the viscosity was 10,900 cps (Brookfield) with an 1/10 rpm thixotropic index of 1.1. The adhesive base was used in the subsequent experiments.

EXAMPLE 2

Many polyurethane curatives were prepared using the following procedure: A polyol, the propylene oxide adduct of pentaerythritol (62.5 parts); Stantone 40ET01, a phthalocyanine blue coloring agent (1.5 parts); dibutyltin dilaurate catalyst (0.03 parts); 1,8-naphthalenediamine (0.97 parts); and powdered talcum (35.0 parts) were charged to a clean, dry reactor. The mixture was stirred and heated at 110° C. under vacuum (5 mm) for 1 hour. The curative was cooled to 60° C. before discharging under nitrogen. The final product had a viscosity of 15,000 cps (Brookfield) with an 1/10 rpm thixotropic index of 1.6. This curative was used with the adhesive base described in Example 1 at a base/curative mix ratio of 3.3/1 to form the final polyurethane adhesive. Other curatives were prepared in the same way. Mix ratios of the various curatives were adjusted for amine and catalyst level. Final mixed adhesives were tested for performance.

EXAMPLE 3

For testing of adhesive, standard lap shear specimens were prepared using the following procedure: FRP panels (16"×16"×0.1") were press molded from a sheet molding compound (glass fiber reinforced unsaturated polyester/styrene). These panels were cut into 4"×12" plaques using a diamond tipped circular saw. Polyurethane adhesive was mixed from the components described in Examples 1 and 2 using adhesive meter-mixing equipment (Model MVR-28 available from Liquid Control Corp.) equipped with a static type mixing head. A bead of mixed adhesive (12" long) was applied along one side of a 4"×12" FRP plaque. This plaque was placed in a 250° F. aluminum fixture and immediately a second plaque was aligned on top of the adhesive bead. The fixture was immediately placed in a 250° F. PRECO press for 4 minutes at about 10 PSI to cure the adhesive. The aluminum fixture was designed to give a final specimen 6"×12" with a 1"×12" overlap bonded area with a standard 0.030" bond line thickness. The bonded specimen was immediately removed from the fixture and excess adhesive was removed from the specimen edges using a knife. The specimen was then cut in half for no posture studies and the other half was placed in an air circulating oven at 150° C. for 0.5 hour to ensure complete cure. The resultant 6"×6" specimens were then cut into the final test samples (1"×6" with a 1" bonded overlap area) using a diamond tipped circular saw. The lap shear adhesive samples were tested using standard Instron type testing equipment with a crosshead speed of 10 mm/minute and in an environmental chamber at 82° C. The samples were conditioned at 82° C. for 0.5 hour before testing.

EXAMPLE 4

Polyurethane adhesives were prepared from the components described in Example 1 (base) and Example 2 (curative) using an 1.35 equivalent ratio of free prepolymer component NCO groups to hydroxyl and amine groups of the curative component. Brookfield viscosities (Model

EXAMPLE 6

Lap shear adhesive test specimens were prepared using the adhesives of Example 4, with the procedure of Example 3. Table I shows the good adhesion to FRP of the amines of the present invention and indicates a postcure may not be necessary.

TABLE I

| | | | | ADHESIVE PROPERTIES | | | | | | |
|---|---|---|---|---|---|---|---|---|---|---|
| | | | | NEWLY MIXED VISCOSITY | | | CURED LAP SHEAR @ 82 C(b) | | | |
| | | | | | | | NO POST CURE | | POST CURED(c) | |
| Amine | M.W. | M.P. C | Conc. in Curative % | @ Sag (a) cps × 1000 #7 @ 20 rpm | Thixo Index 1/10 rpm | Bead Sag(e) | Substrate Failure % | Break PSI | Substrate Failure % | Break PSI |
| 1) 2,3,5,6-Tetramethyl-1,4-phenylene diamino | 164 | 150 | 1.00 | 55 | 3.66 | 1/16" | 94 | 456 | 95 | 432 |
| 2) 1,8-Diamino naphthalene | 158 | 65 | 0.91 | 71 | 5.33 | None | 97 | 543 | 89 | 521 |
| 3) 1,5-Diamino naphthalene | 158 | 186 | 1.00 | 60 | 7.38 | None | 81 | 418 | 97 | 538 |
| 4) 3,3'-Dimethyl-4,4'-diamino biphenyl | 212 | 132 | 1.00 | 68 | 6.92 | None | 77 | 529 | 97 | 562 |
| 5) 3,3'4,4'-Tetra amino biphenyl | 214 | 176 | 1.00 | 66 | 5.33 | None | 86 | 452 | 44 | 459 |
| 6) 4,4'-Methylene bis (3-methyl aniline) | 226 | 155 | 1.00 | 56 | 3.67 | None | 92 | 500 | 90 | 459 |
| 7) Polacure 740M (d) | 314 | 127 | 6.00 | 11 | 1.33 | >2" | — | — | — | — |
| 8) 1,2-Diaminoethane | 60 | 9 | 1.40 | 117 | 2.49 | 3/8" | 1 | 250 | 2 | 325 |
| 9) Commercial 2-component polyurethane adhesive mixed @ 4.6/1 ratio for an NCO index similar to the above examples | | | | 203 | 2.59 | 3/8" | 3 | 404 | 60 | 443 |

(a) Sag Vis. is the lowest Visc. found in the adhesive after mixing the base and curative together.
(b) Cure is done for 4 minute, in a 250° F. fixture and then tested @ 82° C. according to ASTM D-3163.
(c) Samples were post cured for 0.5 hour in an air circulating oven @ 150° C.
(d) Trademark of Polaroid Corp. for trimethylene glycol di-p-amino benzoate.
(e) A 10 mm wide × 5 mm high bead applied to FRP panel on horizontal then FRP panel immediately positioned vertically. Sag was measured after the bead had cured at room temperature.

HBTDV-II, spindle #7 @ 20 rpm) of the newly mixed adhesives were followed with time. Generally the adhesive viscosity goes through a nadir about 5 minutes after mixing. This lowest viscosity is called sag viscosity and represents the time when an adhesive bead is most likely to move. The thixotropic index (the viscosity at 1 rpm divided by the viscosity at 10 rpm) was determined at the sag viscosity. Table I shows the thixotropic indices of amines of the present invention to be about 5 compared to less than 3 for Polacure 740M (aromatic diamine with basicity reducing ester groups), for ethylene diamine (aliphatic amine) and for the commercial 2-component system.

EXAMPLE 5

A 10 mm wide×5 mm high bead of the newly mixed adhesives in Example 4 was applied to a horizontal FRP panel which was immediately stood vertically to elicit the maximum sag in the bead while the adhesive gelled. Table I shows the bead sag of the amines of the present invention to be little or none compared to the considerable sag of the three cited controls.

What is claimed is:

1. In an adhesive composition comprising a polyurethane and polyurea resin system, a catalyst, optionally one or more fillers and optionally a pigment and/or dye, wherein said resin system comprises a prepolymer and a curative composition, said prepolymer being a urethane prepolymer having terminal free —NCO groups, said curative composition comprising one or more polyamines and one or more polyols capable of forming a cross linked polyurethane, the improvement wherein the isocyanate index (—NCO/(—OH+—NH)) of said resin system is from 1.20 to 2 and wherein said one or more polyamines consist essentially of one or more aromatic polyamines, said one or more aromatic polyamines being one or more primary aromatic polyamines with fused polycyclic aromatic rings having at least 2 NH$_2$ groups per molecule, and having H, NH$_2$, C$_1$ to C$_5$ alkyl, or phenyl groups attached to the ring carbons which are not bridge-head carbons.

2. The method which comprises applying between two treatment-free substrates selected from fiberglass reinforced plastic, metal, and plastic the composition of claim 1, then pressing and heating the substrates to cure said composition to adhesively join the two substrates.

3. A laminate comprising two substrates adhered together with the heat and pressure cured adhesive composition of claim 1.

4. The composition of claim 1 wherein said isocyanate index is between 1.35 to about 1.6.

5. The composition of claim 4 wherein said isocyanate index is between 1.35 to about 1.45.

6. The composition of claim 1 wherein said polyol of said curative is a propylene oxide adduct of pentaerythritol.

7. The composition of claim 1 wherein said polyamine is 1,8-diamino naphthalene.

8. The composition of claim 14 wherein said composition has a thixotropic index of more than 3.

9. A laminate comprising two substrates adhered together with a heat cured adhesive, said adhesive prior to curing comprising a polyurethane and polyurea resin system, a catalyst, optionally one or more fillers and optionally a pigment and/or dye, wherein said resin system comprises a prepolymer and a curative composition, said prepolymer being a urethane prepolymer having terminal free —NCO groups, said curative composition comprising one or more polyamines and one or more polyols capable of forming a cross linked polyurethane, wherein the isocyanate index (—NCO/(— OH+—NH)) of said resin system is from 1.20 to 2 and wherein said one or more polyamines consist essentially of one or more aromatic polyamines, said one or more aromatic polyamines being (a) one or more primary aromatic polyamines having the formula

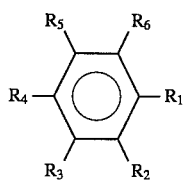

Formula (I)

where $R_1$ is

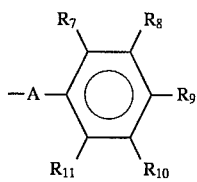

Formula (II)

or the same as any of $R_2$ through $R_6$ and where the $R_2$ through $R_6$ and $R_7$ through $R_{11}$ are independently selected from the groups of: H; $NH_2$; $C_1$ to $C_5$ alkyl; or phenyl; wherein A is an alkylene hydrocarbon containing 0 to 12 carbons and each molecule contains at least 2 $NH_2$ groups, when $R_1$ is not Formula II, at least 4 of the $R_1$ through $R_6$ groups are not H, and Formula I is not diethyl toluene diamine, and where $R_1$ is Formula II and A is 1 to 12 carbon atoms at least 4 of the $R_2$ through $R_{11}$ groups are not H or (b) one or more primary aromatic polyamines with fused polycyclic aromatic rings having at least 2 $NH_2$ groups per molecule, and having H, $NH_2$, $C_1$ to $C_5$ alkyl, or phenyl groups attached to the ring carbons which are not bridge-head carbons or combinations thereof.

10. A laminate according to claim 9, wherein the adhesive prior to curing has a thixotropic ratio above 3 and an NCO:(OH+NH) ratio of 1.35 to 1.6 and wherein at least one substrate is a fiber reinforced plastic substrate and the other substrate is a fiber reinforced plastic, metal, or other plastic substrate.

11. A laminate according to claim 10 wherein said one or more polyamines of said curative consist of said primary aromatic polyamines.

12. The composition of claim 4 wherein said aromatic polyamines of said curative consist of 1,8-diamino naphthalene.

13. A laminate according to claim 10 wherein said polyamines are at least one amine set forth in group (a).

14. A laminate according to claim 10 wherein said polyamines are at least one amine set forth in group (b).

15. A laminate according to claim 10 wherein said one or more polyamines are at least one amine with said fused polycyclic aromatic rings.

16. A laminate according to claim 10 wherein said one or more polyamines are at least one member from the group consisting of (i) 2,3,5,6-tetramethyl-1,4-phenylene diamine (ii) 3,3'-dimethyl-4,4'-diaminobiphenyl (iii) 3,3',4,4'-tetraaminobiphenyl (iv) 4,4'-methylene bis(3-methylaniline) and (v) 4,4'-diamino-2,2'-dimethylbibenzyl.

17. As an article of manufacture, a fiber reinforced plastic substrate adhesively bonded to an other substrate with the adhesive of claim 1, said plastic substrate and said other substrate being free of a surface primer for said adhesive.

18. The article of claim 17 wherein said one or more polyamines of said curative consists of 1,8-diamino naphtalene.

19. The article of claim 18 wherein said other substrate is also a fiber reinforced plastic.

20. In an adhesive composition comprising a polyurethane and polyurea resin system, a catalyst, optionally one or more fillers and optionally a pigment and/or dye, and wherein said resin system comprises a prepolymer and a curative composition, said prepolymer being a urethane prepolymer having terminal free —NCO groups, said curative composition comprising one or more primary polyamines and one or more polyols capable of forming a cross linked polyurethane, the improvement wherein the isocyanate index of NCO groups to $OH+NH_2$ groups of said resin system is from 1.20 to 2 and wherein said one or more primary polyamines consist of one or more aromatic polyamines having an effective reactivity with the prepolymer to form a polyurethane having good sag resistance and good lap shear properties and being one or more primary aromatic polyamines with fused polycyclic aromatic rings having at least 2 $NH_2$ groups per molecule, and having H, $NH_2$, $C_1$ to $C_5$ alkyl, or phenyl groups attached to the ring carbons which are not bridge-head carbons.

21. The composition of claim 20 wherein said one or more polyamines is 1,5-diamino naphthalene or 1,8-diamino naphthalene, wherein the molecular weight of said one or more polyol curatives is from about 450 to about 600, and wherein said isocyanate index is between about 1.35 to about 1.6.

22. The composition of claim 21, wherein said polyisocyanate is MDI, wherein said composition has a thixotropic index of more than 5, and wherein said composition is cured above 90° C.

23. The method which comprises applying between two primer-free substrates selected from fiberglass reinforced plastic, metal, and plastic the composition of claim 20, then pressing and heating to greater than 50° C. the substrates to cure said composition to adhesively join the two substrates.

24. A laminate comprising two substrates adhered together with the heat and pressure cured adhesive composition of claim 20.

25. The composition of claim 20, wherein an effective amount of said one or more primary aromatic polyamines is used such that the thixotropic index is above 5 and the composition is cured by heating to greater than 90° C.

26. The composition of claim 22, wherein the composition is free from primary,aliphatic polyamines, and wherein from about 0.5 to about 3 parts by wt. of said one or more primary aromatic polyamines is used/per 100 parts by wt. of said curative.

27. In an adhesive composition comprising a resin system, a catalyst, optionally one or more fillers and optionally a pigment and/or dye, and wherein said resin system comprises a prepolymer and a curative composition, said prepolymer being a urethane prepolymer formed by reacting a polyol with polyisocyanate in a equivalent ratio (NCO/OH) of about 2 to about 20 and said curative composition comprising a primary polyamine and a polyol and wherein the isocyanate index $NCO/(OH+NH_2)$ of said resin system is about 1.20 to 2, the improvement wherein said composition is free of fast reacting primary aliphatic amines and wherein said polyamine of said curative is one or more primary aromatic polyamines with fused polycyclic aromatic rings having at least 2 $NH_2$ groups per molecule, and having H, $NH_2$, $C_1$ to $C_5$ alkyl, or phenyl groups attached to the ring carbons which are not bridge-head carbons.

28. The composition of claim 27, wherein said primary polyamines is 1,8 or 1,5-diamino naphthalene, wherein said polyisocyanate is MDI, and wherein the thixotropic index of the composition is more than 5.0.

29. The composition of claim 28, wherein said polyol of said curative has an average molecular weight from about 400 to about 650, wherein said composition is cured above 90° C., and wherein said isocyanate index is between about 1.35 to about 1.6.

30. As an article of manufacture, a fiber reinforced plastic substrate adhesively bonded to another substrate with the adhesive of claim 27, said plastic substrate and said other substrate both being free of a surface primer for said adhesive.

31. As an article of manufacture, a fiber reinforced plastic substrate adhesively bonded to another substrate with the adhesive of claim 29, said plastic substrate and said other substrate both being free of a surface primer for said adhesive.

32. The article of claim 31, wherein said other substrate is also a fiber reinforced plastic.

33. A process for adhesively joining two or more substrates individually selected from fiberglass reinforced plastic, metal, and plastic free of a surface primer, the process comprising;

mixing a urethane prepolymer having unreacted isocyanate terminal groups with a curative component forming a urethane adhesive, wherein said curative component comprises one or more polyols and one or more polyamines having primary amine groups; wherein all said primary amines consist essentially of aromatic primary amines;

applying said urethane adhesive to the two or more substrates;

thickening said urethane adhesive by forming homogeneously dispersed urea linkages from the isocyanate terminal groups and said one or more aromatic primary polyamines; and heating said urethane adhesive to a temperature above 50° C. to cure said urethane adhesive and bond said two or more substrates;

said one or more primary polyamines being used in amounts from 0.5 to 3 parts by wt. per 100 parts by wt. of said curative component and they consist essentially of (a) one or more primary aromatic polyamines having the formula

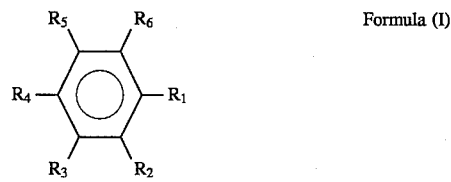

Formula (I)

where $R_1$ is

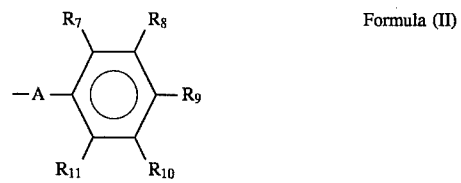

Formula (II)

or the same as any of $R_2$ through $R_6$ and where the $R_2$ through $R_6$ and $R_7$ through $R_{11}$ are independently selected from the groups of: H; $NH_2$; $C_1$ to $C_5$ alkyl; or phenyl, A is an alkylene hydrocarbon containing 0 to 12 carbons and each molecule contains at least 2 $NH_2$ groups, where $R_1$ is not Formula II, at least 4 of the $R_1$ through $R_6$ groups are not H, and Formula I is not diethyl toluene diamine, and where $R_1$ is Formula II and A is 1 at least 4 of the $R_2$ through $R_{11}$ groups are not H, or (b) one or more primary aromatic polyamines with fused polycyclic aromatic rings having at least 2 $NH_2$ groups per molecule, and having H, $NH_2$, $C_1$ to $C_5$ alkyl, or phenyl groups attached to the ring carbons which are not bridge-head carbons, or combinations thereof, and wherein said thickening occurs in 3 seconds or less after said mixing process.

34. A process according to claim 33, wherein said one or more polyamines is 1,5-diamino naphthalene or 1,8-diamino naphthalene, wherein the molecular weight of said one or more polyol curatives is from about 450 to about 600, and wherein said isocyanate index is between about 1.35 to about 1.6.

35. A process according to claim 33, wherein said polyisocyanate is MDI, wherein said composition has a thixotropic index of more than 5, and wherein said composition is cured above 90° C.

* * * * *

UNITED STATES PATENT AND TRADEMARK OFFICE
CERTIFICATE OF CORRECTION

PATENT NO. : 5,508,111
DATED      : April 16, 1996
INVENTOR(S): Arden Schmucker

It is certified that error appears in the above-indentified patent and that said Letters Patent is hereby corrected as shown below:

In claim 8, column 11, at line 14, please delete "14" and insert therefor --1--.

Signed and Sealed this

Twentieth Day of August, 1996

Attest:

BRUCE LEHMAN

Attesting Officer

Commissioner of Patents and Trademarks